UNITED STATES PATENT OFFICE.

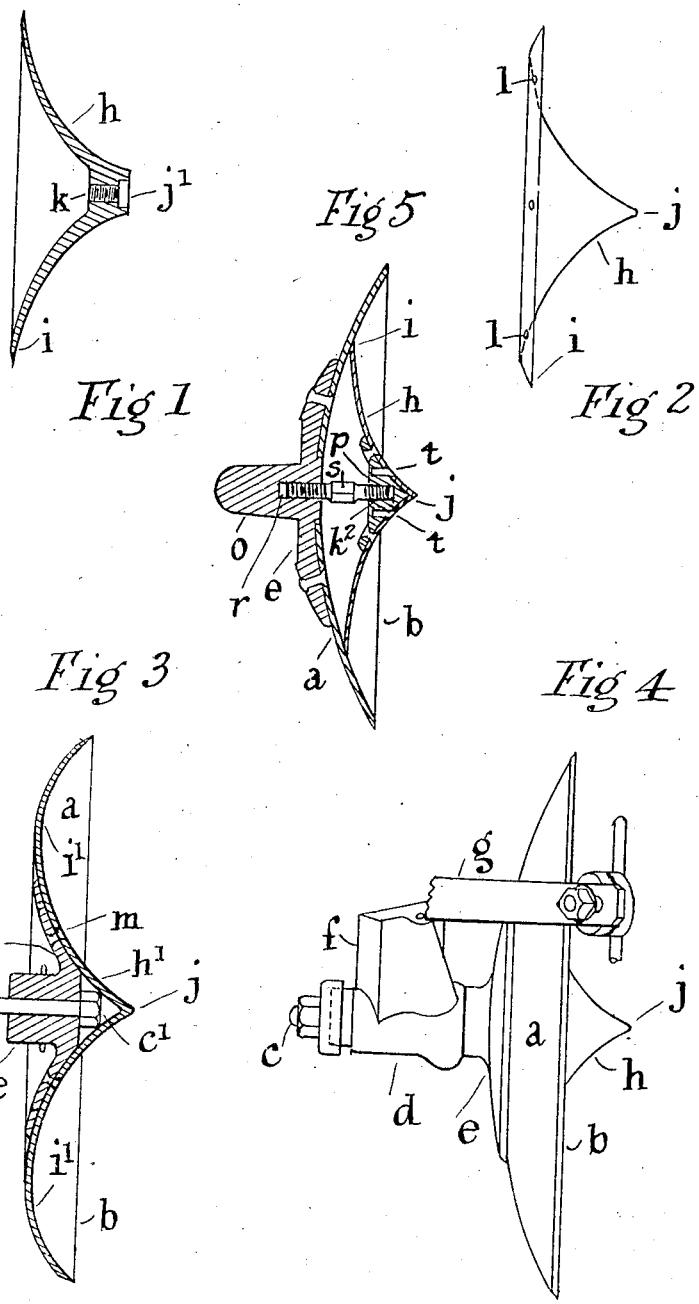

PETER SPEIRS, OF TULLAMARINE, VICTORIA, AUSTRALIA.

PLOW-DISK AND THE LIKE.

No. 882,353.  Specification of Letters Patent.  Patented March 17, 1908.

Application filed October 3, 1907. Serial No. 395,777.

*To all whom it may concern:*

Be it known that I, PETER SPEIRS, a subject of the King of Great Britain and Ireland, &c., residing at Tullamarine, in the State of Victoria, Commonwealth of Australia, have invented certain new and useful Improvements in and Connected with Plow - Disks and the Like; and I do hereby declare the following to be a full, clear, and exact description of the invention, such as will enable others skilled in the art to which it appertains to make and use the same.

This invention relates to plow disks, which when saucer shaped or concave, do not—according to my observation—turn the sod over satisfactorily, inasmuch as the grass of the field is often left uppermost after plowing, instead of being covered—as it should be.

My device is one which causes the sod or land to be turned over by disk plowing so effectively that the grass, or top-side, will be located underneath, or be covered.

In carrying this invention into effect I may so vary the shape of each disk that it will act as the sod turning as well as the plowing member. The sod turning device occupies and projects outwardly from the disk inner surface leaving the outer annular rim of the disk unaltered; or each disk used may be of some ordinary form, with my sod turning attachment connected to it by any suitable means either permanently or removably. The invention is thus applicable to existing disk plows, as well as to new ones. When the attachment is removable there will be the option of plowing with disks without attachments—as may well be done in plowing stubble.

In the drawings herewith embodiments of this invention are illustrated. Figure 1 shows, in vertical middle section, an elevation of an attachment adapted to be secured within a concave or ordinary existing disk. Fig. 2 is an elevation of an attachment as in Fig. 1, but intended to be differently fastened, and having a modified center. Fig. 3 shows in vertical middle section (not in its actual working position, but set with its rim or outer edge vertical) a disk modified according to my invention; the hub also is shown and part of an axle. Fig. 4 is an elevation showing a disk having a sod turning attachment or projection; some of the adjoining parts used in some makes of disk plows are also shown. Fig. 5 shows in vertical middle section a disk with an easily removable and replaceable attachment. The manner of attaching may vary but the illustration is of a case in which the attachment screws into place.

In these drawings the disks are marked $a$, and their outer edges or rims $b$.

$c$ is any suitable axle which may or may not at its front end project through the disk center.

$d$ is an axle bearing, and $e$ any suitable hub secured behind the disk. Instead of a hub as shown in Fig. 3 there is in some cases attached to the disk an ordinary hub which does not project forward as at $n$.

$f$ is a pillar adapted to be connected to a plow beam or framing; $g$ is an arm adapted to carry a disk scraper.

In Fig. 5, $o$ indicates a hub journal as used in some makes of disk plows.

The sod turning member is marked $h$, when not integral with the disk; and $h^1$ when integral. It has an inward sweep or curve rising from or from near its outer edge $i$, (or from the innermost part $i^1$ of the disk when integral therewith) and the edge of this attachment is shaped or placed to fit against the disk face. The rise of the attachment is such that there is a high central projection or boss formed as $j$ the end of which is pointed as at $j$ or blunt as at $j^1$, and in some cases there is through the said end an aperture as $k$. This attachment may be of sheet metal, or be cast, and is in one or more parts. The attachment is brought into shape by any suitable method.

As a connecting device, one or more holes $k$ in the attachment are screw threaded in some cases to allow of the use of a bolt or bolts to fasten part $h$ to the disk or disk hub. A bolt head as $c^1$ of an axle $c$ (see Fig. 3) could be located at the outer end of the hole $k$ in Fig. 1. I may secure attachment $h$ to the disk in any other suitable way; for example by riveting or bolting it through holes $l$, in or near the attachment edge—see Fig. 2.

$k^2$ Fig. 5 shows a hole tapped in $p$ which is a metal filling fixed or riveted to attachment $h$, either to form an end cap or point or as shown to fill the hollow within the boss $j$.

$r$ is a hole tapped in hub $o$.

$s$ is a connecting bolt screw threaded at each end to engage holes $r$ and $k^2$. The bolt $s$ may be angular centrally or have lugs to enable it to be easily operated when being inserted or withdrawn.

$t$ are holes in the attachment $h$ to allow of the insertion of the prongs of a fork or suitable tool whereby to screw attachment $h$ upon bolt $s$ and thus (as tightly as is desired) against the disk $a$, or with equal facility to unscrew it. A bolt is in some cases permanently affixed to the attachment and will then be removable with it, instead of separately. These details may be modified considerably without affecting the device for turning over the sod by reason of the projecting disk center, or disk attachment. In Fig. 3 the hub is shown modified by projecting forward at $n$ to fit against the disk $a$ where the latter rises centrally, and $m$ are rivets. When a scraper is used its shape will be modified from what is usual so that it will fit against the hollow presented to it by the combination with the disk of attachment $h$, or by the disk having a projecting center $h^1$. I do not exclude the use of a sod turning attachment or cone which is revoluble relatively to the disk when plowing.

The extent of the depression in the face of the plow disk or the like, and the curve or contour of its middle part, or its sod turning attachment, are not limited to what I illustrate.

I term any part $h$ or $h^1$ or the like having a high projecting center, a cone; and I term any hollow at its base extending to the disk rim, an annular basin, however these parts are modified in detail.

What I do claim as my invention and desire to secure by Letters Patent of the United States is:—

1. A disk constituting a plow, having a basin within which is located a detachable cone, having a central aperture to receive a fastening means, and key holes to aid in attaching the same, substantially as described.

2. The combination of a disk constituting a plow having a basin, and a detachable cone, located in the same, said cone provided with a screw threaded aperture and key holes, a rod connecting said cone and disk, fitting said aperture, and said holes, adapted to receive an instrument to aid in attaching and detaching said disk, substantially as described.

3. The combination of a disk constituting a plow having a basin and a hub, provided with a screw aperture and a detachable cone, also having a screw threaded aperture, a rod, screw threaded at each end and fitting said apertures, said cone also provided with key holes to aid in readily attaching and detaching said cone to said disk, substantially as described.

In testimony whereof, I affix my signature in presence of two witnesses:

PETER SPEIRS.

Witnesses:
 GEORGE A. TURRI,
 BEATRICE M. LOWE.